United States Patent [19]

Keough

[11] Patent Number: 4,648,328

[45] Date of Patent: Mar. 10, 1987

[54] APPARATUS AND PROCESS FOR THE PYROLYSIS OF TIRES

[76] Inventor: William R. Keough, 1854 Hunters Ridge Dr., Bloomfield Hills, Mich. 48103

[21] Appl. No.: 781,520

[22] Filed: Sep. 30, 1985

[51] Int. Cl.$^4$ .............................................. F23G 5/12
[52] U.S. Cl. ................................... 110/229; 110/242; 110/346; 201/25; 202/117
[58] Field of Search ............... 110/242, 229, 249, 346; 201/25; 48/209, 111; 202/117

[56] References Cited

U.S. PATENT DOCUMENTS

| | | | |
|---|---|---|---|
| 4,084,521 | 4/1978 | Herbold et al. | 110/242 |
| 4,098,649 | 7/1978 | Redker | 201/25 X |
| 4,235,676 | 11/1980 | Chambers | 201/25 X |
| 4,401,513 | 8/1983 | Brewer | 201/25 X |
| 4,402,791 | 9/1983 | Brewer | 201/25 X |
| 4,452,154 | 6/1984 | Kono et al. | 110/346 |

Primary Examiner—Edward G. Favors

Attorney, Agent, or Firm—Hiram P. Settle

[57] ABSTRACT

This invention relates to an apparatus and process for the pyrolysis of used vehicular tires. The apparatus includes a reaction chamber supported internally of an insulated casing and heated by heating means interposed between the chamber and the casing. Tire fragments are introduced into and removed from the reaction chamber through airlock mechanisms to prevent the ingress of ambient air as the fragments are conveyed through the chamber by a chain and flight conveyor scraping any accumulated solids from the chamber and the conveyor. All portions of the apparatus contacting the pyrolysis reaction products are clad with a layer of aluminum oxide to prevent corrosion. The process includes shredding the used tires, preheating the tire fragments if desired, passing the fragments through the reaction chamber, separating solid and gaseous products, recycling a portion of the gaseous product to the heating means, and recoving salable gas, oil and carbon products.

10 Claims, 7 Drawing Figures

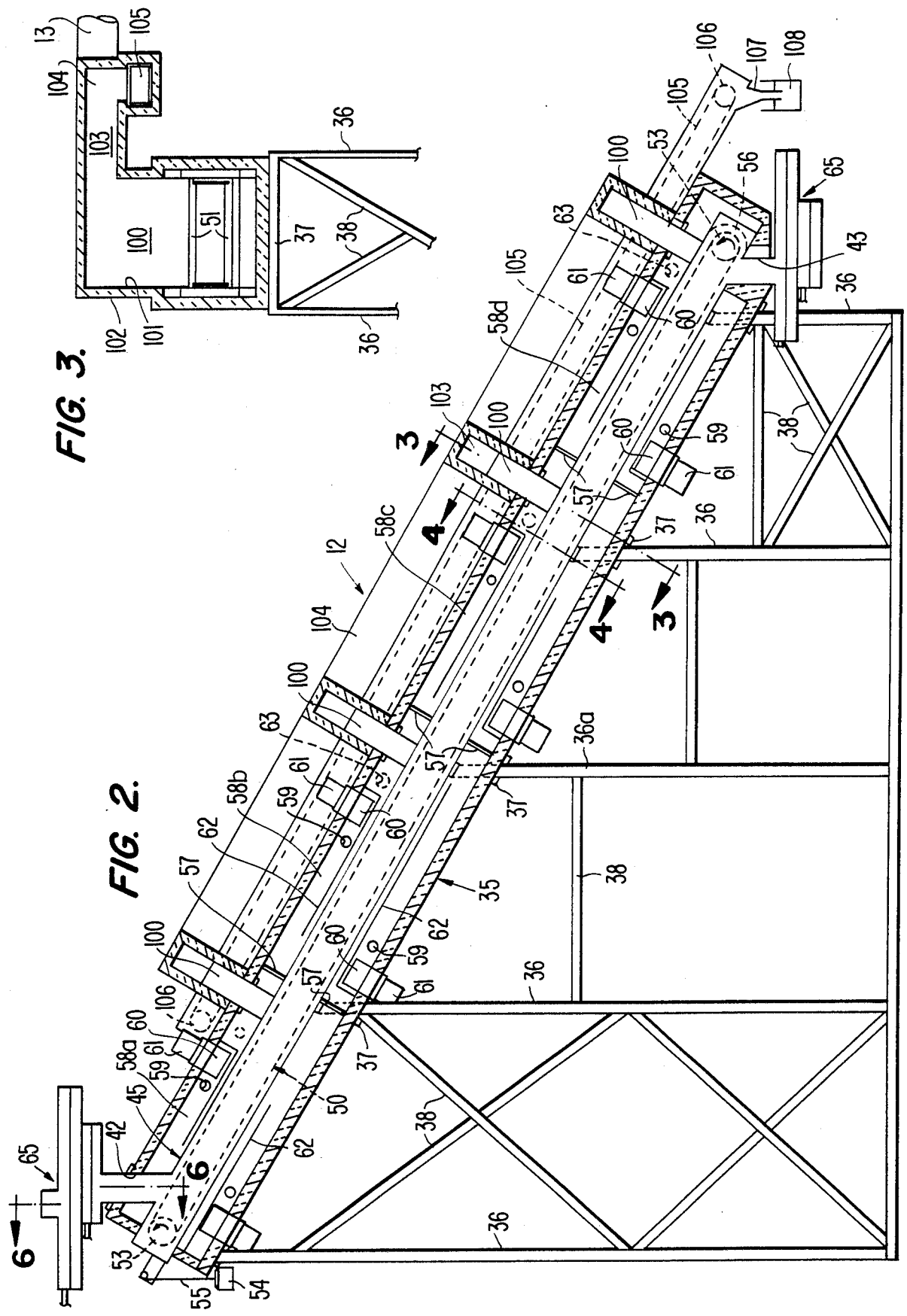

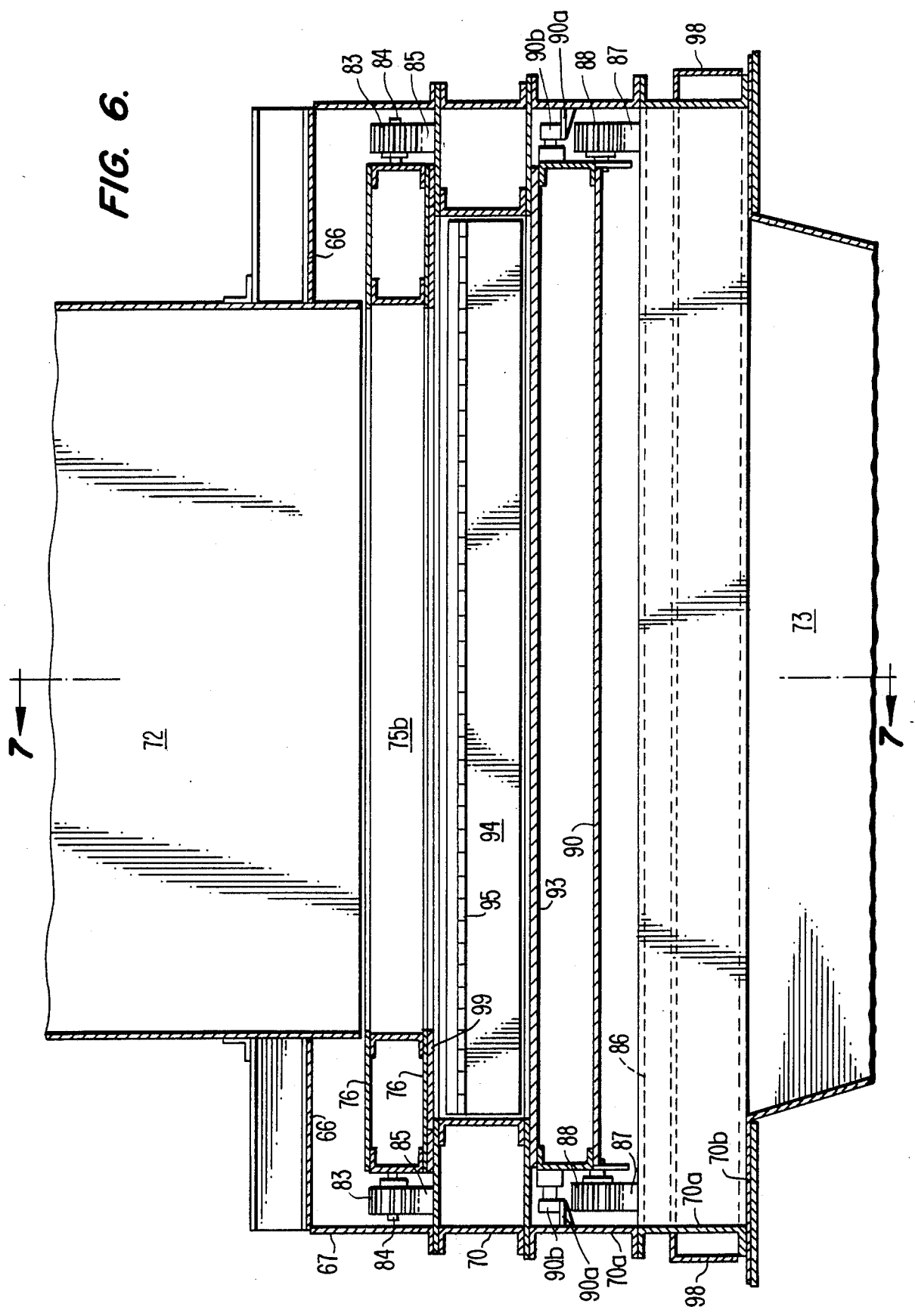

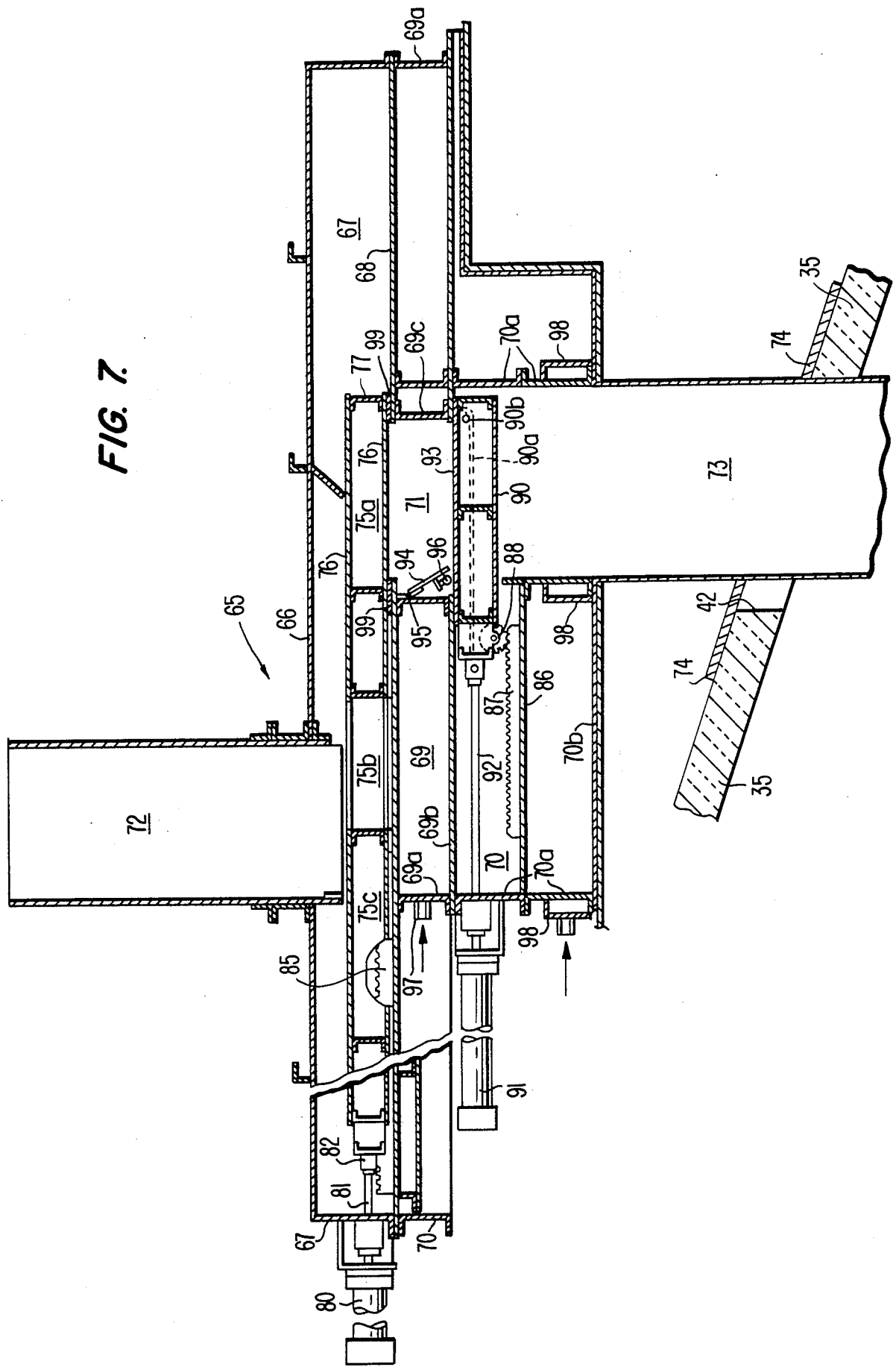

APPARATUS AND PROCESS FOR THE PYROLYSIS OF TIRES

BACKGROUND OF THE INVENTION

Prior to the present invention, there have been many attempts to effectively dispose of the huge stocks of used vechicular tires which are now in existence. There still is not available any viable, commercial process which provides a cost-effective method of disposing of used tires. They still are being stockpiled in dumping grounds which are so unsightly as to arouse public ire. Attempts to shred used tires and to bury the tire fragments in landfill installations have failed, since the fragments again arise to surface, pollute the groundwater, and occasionally catch fire.

The problems of pyrolysis of tires are many and varied. Pyrolysis, in essence the destructive distillation of tire fragments in the absence of air, results in the generation of corrosive, noxious fumes which coat and corrode the interior of any reactor vessel which has been heretofore attempted. The explosive character of the fumes in the presence of any oxygen, and the formation of undesired gaseous byproducts at reaction temperatures in excess of 1,300° F. are formidable obstacles to successful pyrolysis. Further, it has heretofore been impossible to obtain adequate amounts of reaction products of sufficient value to economically justify the capital costs and processing costs involved in pyrolysis.

All in all, prior to the present invention, there has not existed a commercially viable process for the pyrolysis of used vehicular tires.

BRIEF DESCRIPTION OF THE INVENTION

The present invention now proposes a new and novel apparatus and process for the pyrolysis of used vehicular tires. The pyrolysis reactor possesses several unique characteristics which solve the problems of continuous pyrolysis of shredded tire fragments on a continuing, commercially viable basis.

Generally, the reactor includes an outer insulated casing which completely surrounds a reaction muffle or casing enclosing a reaction chamber in which the pyrolysis is accomplished. The chamber is externally heated by combustion and circulating apparatus interposed between the outer casing and the inner reactor casing, the reaction vessel being heated solely by conduction heating through the metallic walls of the reactor vessel. The shredded tire fragments are loaded into the reaction vessel and removed from the reaction vessel through airlock mechanisms which ensure the loading and unloading of the reactor vessel without the admission of any air into the interior of the vessel. The interior of the reaction vessel and all the portions of the apparatus which contact the fumes generated on pyrolysis are coated with aluminum and/or aluminum oxide to prevent corrosion as the tire fragments are conveyed through the interior of the reaction vessel.

The shredded tire fragments are heated to successively higher temperatures in a plurality of individually heated pyrolysis zones within the reaction vessel, thereby avoiding overheating and "explosion" of the tire fragments, while gradually heating the tire fragments so that the entire thickness of the bed of fragments travelling through the reaction vessel is uniformly heated. Also, the tire fragments are conveyed by a chain and flight conveyor with the conveyor flights scraping the interior of the reaction vessel to prevent the accumulation of carbon-containing and sulfur-containing contaminants on the interior surfaces of the reaction chamber. In this manner, it is possible to avoid the buildup of carbon-containing and/or sulfur-containing solid deposits interiorly of the reaction chamber to an extent sufficient to interfere with the feeding of the tire fragments through the reaction zone.

The gaseous products of the pyrolysis process are removed from each of the zones and are conducted to a facility where the oil is separated from the gaseous components, and a portion of the gaseous component is recirculated back to the reactor for combustion. The collected oil can then be sold as refinery stock, as domestic heating oil, and the like, and any excess gaseous component can also be sold. The solid components are removed from the reaction zone, the steel and glass fibers are separated therefrom, and the carbon residue can be further processed to carbon black.

DESCRIPTION OF THE DRAWINGS

FIG. 2 is a longitudinal sectional view of the pyrolysis reactor of the present invention.

FIG. 3 is a sectional view taken along the plane 3—3 of FIG. 2.

FIG. 6 is an enlarged sectional view taken along the plane 6—6 of FIG. 2.

FIG. 7 is a sectional view taken along the plane 7—7 of FIG. 6.

DETAILED DESCRIPTION OF THE INVENTION

Figure 1:
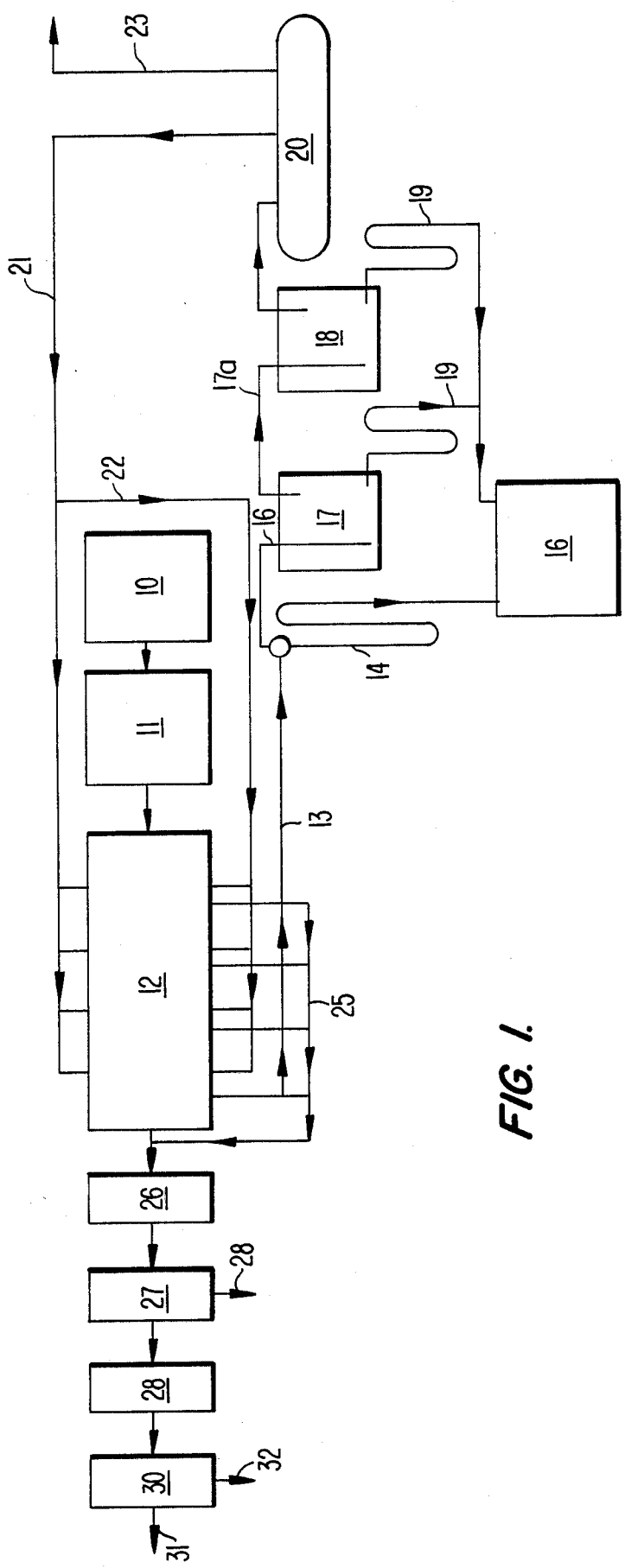
FIG. 1 is a schematic diagram of the process of the present invention utilizing the apparatus of the present invention.

As indicated in FIG. 1, whole used tires of any type or kind are chopped or shredded in a shredder 10 of known, conventional type, preferably of the type manufactured by Mitts and Merrill or by Lexxel. The tires are shredded to a rectangular configuration, prefereably on the order of 3" by 3" or less and of a thickness equal to the tire wall thickness.

The chopped material preferably is fed into a preheat furnace 11 in which the chopped fragments are heated in recirculating ambient atmosphere to a temperature at which the material does not evolve any fumes, does not become sticky, and does not agglomerate, preferably on the order of from about 300° F. to about 600° F. If desired, the preheating can be eliminated.

The preheated fragments are then introduced into a pyrolysis reactor 12 of a unique design illustrated in FIGS. 2 through 7, for pyrolysis in an oxygen-free atmosphere at a temperature ranging from about 800° F. to about 1600° F. Preferably, the temperature ranges from about 950° F. to about 1150° F. in order (1) to avoid the formation of undesired or harmful flue gases and (2) to produce the maximum oil content plus the required combustion gas to heat the reactor.

The reaction chamber inlet end is elevated relative to the outlet end, so that the reaction chamber floor over which the fragments travel is at approximately the angle of repose of the tire fragments. Thus, the conveyor can more easily move the fragments through the reaction chamber, and the fragments will be slightly agitated as they travel. The layer of fragments in the reaction chamber is of limited depth, on the order of 2 to 6 inches, to ensure uniform heating through the entire depth. The fragments preferably remain in the reaction chamber for a period of from about 20 to about 60 minutes. The capacity of a reactor having a reaction chamber about 60 feet in length and about 6 feet wide, at a residence time of about 30 minutes and a depth of about 3 inches, is about 60 tons of fragmented tires per day. The yield should be about 27 tons of oil, about 8.1 tons of combustion gas, about 19.8 tons of carbon product, and from 3 to 4 tons of metal wire. The remainder is glass tire fiber and loss.

The hydrocarbon content of the tires is evolved in the reactor 12 as a gas and is removed through a conduit 13. The evolved gas flows from the conduit 13 into a separation facility which typically will include a drain conduit 14 through which oil condensate flows to an oil storage tank 15, while the non-condensed vapors flow through conduit 16 to a cooled separation tank 17. The condensate from the tank 17 travels through conduit 17a into a second cooled separation tank 18. The condensate from the tanks 17 and 18 flows to the oil storage tank 16 through conduits 19.

The remaining gas from the second separatory tank 18 flows into a gas storage tank 20 from which sufficient gas is withdrawn through conduits 21 and 22 to furnish combustion gas for the pyrolytic reactor 12. Any remaining gas from the tank 20 can be removed through conduit 23 for sale.

Any solids in the primary removal conduit 13 are removed by a conveyor schematically illustrated at 25, and these solids, plus the solids discharged from the pyrolytic reactor 12 are introduced into a crusher 26 which reduces the "char" from the reactor to a powder. The crushed powder from the crusher 26 is introduced into a flotation unit 27 filled with water to effect separation of the powdered char, which floats, of any steel fibers in the char, which sink. The steel fibers are removed, as at 28.

From the flotation unit 27, the char admixed with glass fibers is dried, as in unit 29, and the dry char in admixture with glass fibers, cotton fragments, and the like, is passed through an electrostatic separator 30 which effectively separates the carbon black and fiber constituents. The carbon black is removed at 31 for further processing or packaging, and the fibrous materials are removed at 32.

The pyrolytic reactor 12 of the present invention is illustrated in detail in FIGS. 2 through 7, and this reactor includes an exterior casing 35 which is supported by a supporting framework, including vertical supports 36, transverse beams 37 joining the supports 36 and appropriate intermediate bracing 38. It will be noted that the reactor casing 12 is inclined at an appreciable angle which is approximately the angle of repose of shredded tire fragments.

Figure 4:
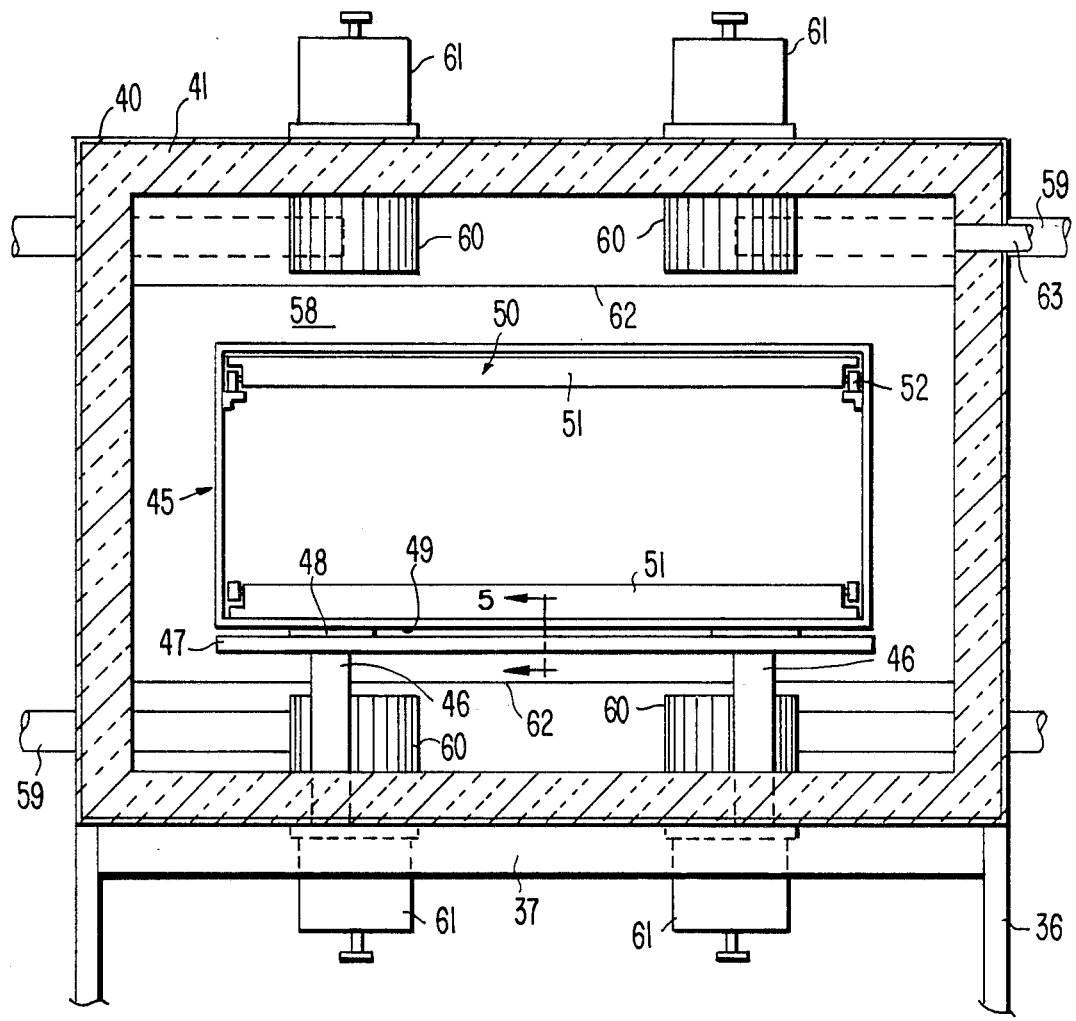
FIG. 4 is an enlarged sectional view taken along the plane 4—4 of FIG. 2.

As illustrated in FIGS. 2, 3 and 4, the furnace exterior casing includes an outer metal sheath 40 of steel or the like and an interior insulated lining 41 of conventional refractory material. The casing is of rectangular cross-section (FIGS. 3 and 4), and is provided with an upper inlet opening 42 and a lower outlet opening 43.

Located interiorly of the casing 35 and extending longitudinally thereof is an inner, metallic, completely sealed reaction chamber 45. This inner reaction chamber 45 is of sufficient length to bridge the inlet opening 42 and the outlet opening 43 of the casing 35 and is of a rectangular cross-section substantially smaller than the cross-section of the casing, see FIG. 4. The muffle 45 is fabricated completely of aluminized steel, i.e., steel which bears an aluminum and/or aluminum oxide coating over its entire surface. The aluminum coating is formed on the steel by immersing the steel in a bed of aluminum chloride at an elevated temperature (on the order of 1875° F.) for a period of several weeks. The result is an aluminum coating on the steel, the surface of which may oxidize to aluminum oxide. Extreme care is utilized in welding shut the sealed inner chamber 45 in order to prevent interruption of the aluminum coating on the interior of the reaction chamber. It has been found that such an aluminum or aluminum oxide coating will prevent corrosion of the steel upon its exposure to the highly corrosive fumes generated upon pyrolysis of the used tires, the evolved gas containing sulfur, various hydrocarbons, and some solid carbon particles borne therein.

The sealed chamber 45 is supported independently of the exterior casing 35 upon vertical supports 46 projecting upwardly from the transverse beams 37 (FIG. 4) into the interior of the casing 35. Mounted on the free upper ends of the supports 46 are upwardly opening channels 47 providing a guideway for support rollers 48 which contact the undersurface 49 of the reaction chamber 45 at four of the vertical supports 36. At the center vertical support 36a, the vertical support is welded directly to the undersurface 49 of the reaction chamber 45. Thus, the reaction chamber 45 is fixed to the center support 36a, yet the remainder of the reaction chamber is supported for displacement interiorly of the casing 35, thereby accommodating thermal expansion of the reaction chamber 45 interiorly of the casing as the reaction chamber is heated to and maintained at its operating temperature.

Located internally of the casing 35 and interiorly of the reaction chamber 45 is a conveyor 50 comprising pusher slats or flights 51 carried by chain links 52 at their ends and trained about sprockets 53 located at the upper and lower ends, respetively, of the reaction chamber 45, one of the sprockets 53 (preferably the lower sprocket) being driven to advance the chains and the slats. A take-up weight 54 is connected by a cable 55 to the upper sprocket 53 to the upper sprocket axle (not shown) to maintain the chains 52 taut. It will be noted from FIG. 4 that the conveyor slats 51 of the conveyor 50 scrape any deposited carbon from the bottom of the chamber 45 on which the tire fragments are supported as they are conveyed, and the flights run closely beneath the upper inner surface of the reactor vessel 45 for the same purpose. At the bottom of the reaction chamber and interiorly thereof, a curved interior wall 56 concentric with the sprocket 53 is provided to prevent a buildup of carbon or other debris at the lower end of the reaction chamber, this surface 56 being scraped by the conveyor flights 51.

As best seen in FIGS. 2 and 4, the space between the interior of the casing 35 and the exterior of the reaction chamber 45 is subdivided by spaced walls 57 into four successive heating zones 58a, 58b, 58c and 58d, which are adapted for independent heating to successively higher temperatures. The zone 58a is heated to a lesser temperature than the zone 58b, the zone 58b to a lesser temperature than the zone 58c, and the zone 58c to a lesser temperature than the zone 58d. The purpose of this zone heating is to avoid exposure of the shredded tire fragments to an initial high temperature. It has been found that the immediate subjection of the fragments to the final reaction temperature results in the rapid evolution of gaseous and liquid hydrocarbons from the interior of the shredded fragments, causing the fragments to "explode" and to distribute carbon and other solid components throughout the reaction zone. By gradually increasing the temperature in the successive zones 58a through 58d such "explosion" is avoided.

Each zone is provided with its own heating and circulation means, such means including combustion burners 59 and fans 60 driven by motors 61 or other suitable drive means. As seen in FIGS. 2 and 3, four burners 59 and four fans 60 are provided for each successive zone, two of the fans and burners being located on top of the reaction chamber 45 and two of the fans and burners being located on the bottom of each zone adjacent the longitudinal extremities of the zones. A deflector plate 62 is located each adjacent fan to direct the fan output toward the opposite end of the respective zones, and each zone is provided with an exhaust port 63 for exhausting the products of combustion from that zone.

Thus, it will be seen that the zones 58a-58d are each individually heated by the combustion of the appropriate burners 59 and the adjacent fans 60 circulate the products of combustion interiorly of each zone to heat the reaction chamber 45 by conduction through the metal walls of the combustion zone. In this way, there is no intermingling of the products of combustion with the products of pyrolysis, any possibility of introducing non-combusted air is eliminated, neither the burners nor the fans are exposed to the atmosphere internally of the reaction zone, and the zones may be differentially heated to subject the shredded tire fragments to successively increasing degrees of heat, thereby gradually evolving the gaseous products therefrom without "exploding" the fragments within the reaction chamber.

During operation of the furnace, shredded or fragmented used vehicular tire carcasses are conveyed by the conveyor 50 through the reaction chamber 45 which is heated in successive zones to a final temperature on the order of from 1,000° to 1,200° F., at which pyrolysis occurs. The interior of the reaction zone 45 is filled with the vaporized pyrolysis product from the tire carcasses, and the residual solid products remain upon the conveyor to be discharged therefrom at the discharge end.

It is critical that no air or other oxidizing gas be introduced into the interior casing 45 during operation, because any oxidation of the vaporized pyrolysis products, primarily saturated and unsaturated hydrocarbons, sulfur and carbon would result in immediate and explosive combustion.

To introduce the chopped used vehicular tire carcasses into the inner chamber without simultaneously admitting air, an airlock mechanism 65 is utilized. This airlock mechanism is illustrated in detail in FIGS. 6 and 7 of the drawings. From FIG. 7 of the drawings, it will be seen that the airlock mechanism 65 comprises an upper sheet metal enclosure 66 having a plane upper surface and downturned marginal flanges abutting a medial support plate 68 to enclose an upper dispensing compartment 67. An intermediate dispensing compartment 69 is provided by a surrounding channel iron wall 69a and a horizontal floor plate 69b overlying a lower discharge compartment 70 defined by peripheral walls 70a beneath the compartment 69 and communicating therewith through a medial discharge opening 71 defined by vertical walls 69c. A lower enclosure wall 70a for the compartment 70 is superimposed upon the inner casing 45 (FIG. 2) to overlie the inlet end of the conveyor 50.

An upper inlet chute 72 communicates with the upper compartment 67, and a discharge chute 73 overlies the discharge opening 71 of the compartment 69, the discharge chute 73 having its outlet end closely overlying the conveyor 50 adjacent the upper sprocket 53, as shown in FIG. 2. The discharge chute 73 projects through the aperture 42 in the outer casing 35. As shown in FIG. 7, it will be noted that the casing opening 42 is larger than the discharge chute 73 and a closure plate 74 is secured to the discharge chute to ensure complete coverage of the opening 42. As the inner casing 45 expands as it is heated to its operating temperature, a discharge chute must move with the inner casing 45. The enlarged opening 42 accommodates such movement, and the plate 74 prevents any leakage of ambient air.

Located within the upper compartment 67 is a slidable charging element indicated generally at 75 and comprising parallel upper and lower plates 76 joined by reinforcing angles 77 which subdivide the charging door element into three sections, namely a forward closed sealing section 75a, an intermediate dispensing section 75b open at its top and bottom, and a rear closed sealing section 75c. The charging door element is slidable along the surface 68 from a first receiving position illustrated in FIG. 7 to a second discharge position in which the element is displaced to the right as viewed in FIG. 7. The charging door element 75 is actuated by a fluid pressure actuated cylinder 80 having an actuating rod 81 connected to the door, as at 82. A single actuating cylinder 80 is utilized and the movement of the elongated door is stabilized by a rack and pinion arrangement at each lateral extremity of the door as illustrated in FIG. 6. This rack and pinion arrangement includes a pinion 83 mounted at each extremity of the door on a subshaft 84 to engage a fixed tooth rack 85 extending parallel to the direction of movement of the door and outside the confines of the door. It will be noted from FIG. 6 that the inlet chute 72 is of substantially the same width as the conveyor 50 and that the door 75b, and the remainder of the charging apparatus of FIG. 6 is of somewhat greater width.

Figure 5:
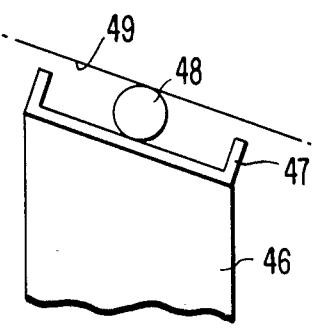
FIG. 5 is an enlarged sectional view taken along the plane 5—5 of FIG. 4.

The lower compartment 70 is subdivided by a horizontal support plate 86, upon which is mounted a rack 87 engaged by a pinion 83 carried by a second charging door element 90 overlying the dispensing chamber 70, as illustrated in FIG. 7 and retractable to the left, as viewed in FIG. 4, by a fluid-actuated cylinder 91 having its piston rod 92 connected to the door element 90. The door element 90 is rectangular in configuration and has a plane upper surface 93 closing the dispensing opening 71 when the element is positioned as illustrated in FIG. 7. Positioned within the dispensing opening 71 is a deflector plate 94 pivotable about a pivot pin 95 and having a lower roller 96 contacting the upper surface 93 of the door element 90. As best shown in FIG. 5, the charging door 90 is stabilized and supported vertically by rollers 90a mounted on the lateral extremities of the door and each engageable with a guide plate 90b mounted on the walls 70 above the pinion 88. Thus, the door 90 is retained snugly against the bottom of the dispensing opening 71.

The compartment 69 is cooled by air introduced through an air conduit 97, and air is also introduced for cooling through a cooling jacket 98 for cooling the compartment 70 and the discharge chute 73. If desired, additional cooling air can be introduced into the charging doors 75 and 90.

In operation, fragmented vehicular tires are introduced into the inlet chute 72 and stored therein. The tire fragments flow from the chute 72 into the medial dispensing compartment 75b of the door element 70, when the element 70 is positioned as illustrated in FIG. 7. At this time, the dispensing opening 71 is closed by the sealing portion 75a of the door element 75, and the undersurface of the door element carries resilient sealing strips 99 for this purpose. At this time, the dispensing opening 71 also is closed at its lower end by means of the lower door element 90.

Upon extension of the cylinder rod 81, the door element 75 is moved to the right to position the dispensing compartment 75b over the dispensing opening 71, allowing the material in the compartment 75b to fall into the compartment 71 on top of the lower door element 90. The deflector leaf 94 deflects the material away from the inner section of the bottom of the compartment 69 and the door element 90, thereby avoiding the possibility of jamming when the coor unit 90 is open. Thus, the contents of the discharge compartment 75b are discharged onto the upper surface 93 of the element 90 while the element 90 continues to seal the interior of the reaction chamber 45 from the atmosphere.

Next, the door element 75 is returned to its position illustrated in FIG. 7 at which the sealing extension 75a of the door element 75 again seals the upper end of the dispensing compartment 71 containing the material. The cylinder 91 is then actuated to retract its rod 92 and to move the door element 90 to the left, allowing the material on the upper surface of the plate 90 to be discharged into the discharge chute 72 and onto the upper surface of the conveyor 51. During this operation, the upper door element 75 has its sealing extension 75a in sealing contact with the plate 68. The pivot leaf 94 serves to scrape material from the upper surface 93 and into the discharge chute as the door is retracted therebeneath. When the door is fully retracted, the pivot leaf 94 pivots in a clockwise direction with the roller 94 contacting the leading edge of the door 90. Once the material from the door surface 93 has been dumped through the dispensing chute 73 onto the bottom of the reaction chamber 45 for conveyance by the conveyor flights 51, the door 90 is returned to its position of FIG. 4 by extension of the cylinder rod 92 and the pivot leaf 94 is returned to its illustrated position of FIG. 7. Thus, by utilizing the upper charging door 75 and the lower charging door 90 in combinaction and by properly sequencing them, the interior of the furnace is isolated from any ambient atmosphere and an oxygen-free atmosphere is maintained in the interior reaction chamber. The doors are sequenced as desired by a simple sequencing circuit (not shown) utilizing limit switches which are responsive to the positions of the respective doors, all as is well known in the art.

An identical airlock mechanism 65 is provided at the outlet opening 43, to prevent the admission of any air during the discharge of solid reaction products.

As best illustrated in FIGS. 2 and 3 of the drawings, the interior of the reaction chamber 45 communicates with an upwardly extending outlet opening 100 for each of the differentially heated portions of the reaction chamber. From FIG. 3, it will be seen that each of these upward openings is the full width of the reaction chamber and is defined by a metallic liner 101 formed of the same aluminum oxide-coated steel as the reaction chamber itself, surrounded by refractory insulation 102. Each outlet 100 communicates through a joining passage 103 with a conduit 104 extending longitudinally of the reactor and joining the outlet openings 103. A conveyor 105 trained about sprockets 106 underlies the conduit passage 104 throughout its entire length and serves to remove therefrom any solids which may be carried over by and deposited from the vapors within the passage 104. The conveyor 105 discharges through a discharge passage 106 into a container 108 filled with water and acting as a seal. The container 108 empties into the flotation unit 26 of FIG. 1.

The vapors within the longitudinally extending passage 104 are removed adjacent the uppermost vertical passage 100 through a conduit 103 so that the vapors are introduced into the conduit 13 of FIG. 1 for passage to the oil-gas separation system described in connection with FIG. 1 of the drawings.

All of the metallic surface exposed to the corrosive atmosphere internally of the reaction chamber 50 are aluminized, i.e., coated with aluminum or aluminum oxide, including the conveyor, the vapor outlet openings 100, 103, 104, and the directly exposed portions airlock mechanisms 65.

I claim:
1. A reactor for the pyrolysis of fragmented used tires comprising
   (1) an inner, completely sealed reactor liner;
   (2) an outer insulated housing perimetrically enclosing the inner liner and spaced perimetrically therefrom;
   (3) means interposed between the liner and the housing to divide the space therebetween into thermally isolated longitudinally adjacent zones traversed by the inner liner;
   (4) a single chain and flight conveyor enclosed in the inner liner for conveying tire fragments therethrough, the conveyor flights travelling in close proximity to the interior surfaces of said liner to prevent the accumulation of reaction products thereon;
   (5) air lock means for the ingress of reaction ingredients into and the egress of solid reaction products from the inner liner;
   (6) outlets for the egress of gaseous reaction products from the inner liner; and
   (7) separate combustion heating means positioned in each of said longitudinally adjacent zones and interposed between the outer housing and the inner liner for differentially heating the inner liner in successive zones solely by conduction through the inner housing.

2. A reactor for the pyrolysis of fragmented used tires comprising
   (1) an inner, completely sealed reactor liner;
   (2) an outer insulated housing perimetrically enclosing the inner liner and spaced perimetrically therefrom;
   (3) a conveyor enclosed in the inner liner for conveying tire fragments therethrough;
   (4) air lock means for the ingress of reaction ingredients into and the egress of solid reaction products from the inner liner;
   (5) outlets for the egress of gaseous reaction products from the inner liner;

(6) heating means interposed between the outer housing and the inner liner for heating the inner liner; and (7) all portions of the reactor exposed to the reaction products are aluminized.

3. A reactor for the pyrolysis of fragmented used tires comprising (1) an inner, completely sealed reactor liner;

(2) an outer insulated housing perimetrically enclosing the inner liner and spaced perimetrically therefrom;

(3) a conveyor enclosed in the inner liner for conveying tire fragments therethrough;

(4) air lock means for the ingress of reaction ingredients into and the egress of solid reaction products from the inner liner;

(5) outlets for the egress of gaseous reaction products from the inner liner;

(6) heating means interposed between the outer housing and the inner liner for heating the inner liner; and (7) the liner is secured to the outer housing at a single location and is otherwise isolated therefrom for independent thermal expansion.

4. A pyrolysis reactor comprising (1) inner and outer housings which are substantially longitudinally coextensive and which are perimetrically spaced apart by a heating zone completely isolated from the interior of the inner housing;

(2) means located in said heating zone and spaced along the length thereof for heating the inner housing soley by conduction;

(3) airlock means traversing said heating zone for the ingress of reaction ingredients into and the egress of solid reaction products;

(4) conduit means opening onto the interior of the inner housing and traversing the outer housing for the egress of gaseous reaction products from the inner housing;

(5) conveyor means for conveying solid materials through said inner liner between said airlock means; and (6) all portions of the reactor exposed to either solid or gaseous reaction products are aluminized.

5. A process for pyrolizing tire fragments comprising (1) introducing tire fragments into a reaction chamber while sealing the chamber interior from the ambient atmosphere;

(2) conveying the fragments through the chamber as a layer of fragments of limited thickness;

(3) exteriorly heating said chamber to subject the fragments to a maximum temperature of less than about 1600° F.;

(4) removing evolved gaseous reaction products from the chamber;

(5) discharging solid reaction products from the chamber without admitting ambient atmosphere into the chamber;

(6) contacting reaction products only with aluminized surfaces; and (7) scraping deposited reaction products from at least some of the reaction chamber walls.

6. A pyrolysis reactor comprising longitudinally coextensive inner and outer housings spaced apart by a heating space extending completely about the perimeter of the inner housing; means for introducing material to be pyrolyzed into the inner housing and means for removing pyrolysis products from the inner housing; heating means located in aid space to heat the interior of the inner housing to pyrolysis temperature solely by conduction through the inner housing walls; means supporting the outer housing in a fixed position; and means including rollers carried by columns extending through the outer housing for supporting said inner housing for expansion independently of said outer housing at pyrolysis temperatures.

7. A process as defined in claim 5, wherein the tire fragments are progressively heated to a maximum temperature ranging from about 900° F. to about 1150° F., the thickness of the layer of fragments ranges from about 2 inches to about 6 inches, and the tire fragments are in the chamber for from about 20 to about 60 minutes.

8. A reactor as defined in claim 6, wherein all portions of the reactor exposed to pyrolysis products are aluminized.

9. In a pyrolysis reactor having a housing, a conveyor in the housing, airlock means for introducing reaction materials into the housing and for removing solid reaction products from the housing, conduit means for removing gaseous reaction products from the housing, and means for heating the housing to a pyrolysis temperature, the improvement of aluminizing all portions of the reactor exposed to the pyrolysis reaction products.

10. In a pyrolysis reactor having an inner housing enclosed within a fixed outer housing and heated by means interposed between the housings, the improvements of fixedly securing the housings at a single location, and supporting the inner housing on anti-friction means interposed between the housings and contacting supports fixed relative to the outer housing to accommodate thermal expansion of the inner housing as it is heated to a pyrolysis temperature.

* * * * *